Dec. 16, 1947.    H. D. STECHER ET AL    2,432,592
TUBULAR CONNECTION
Filed Oct. 25, 1943
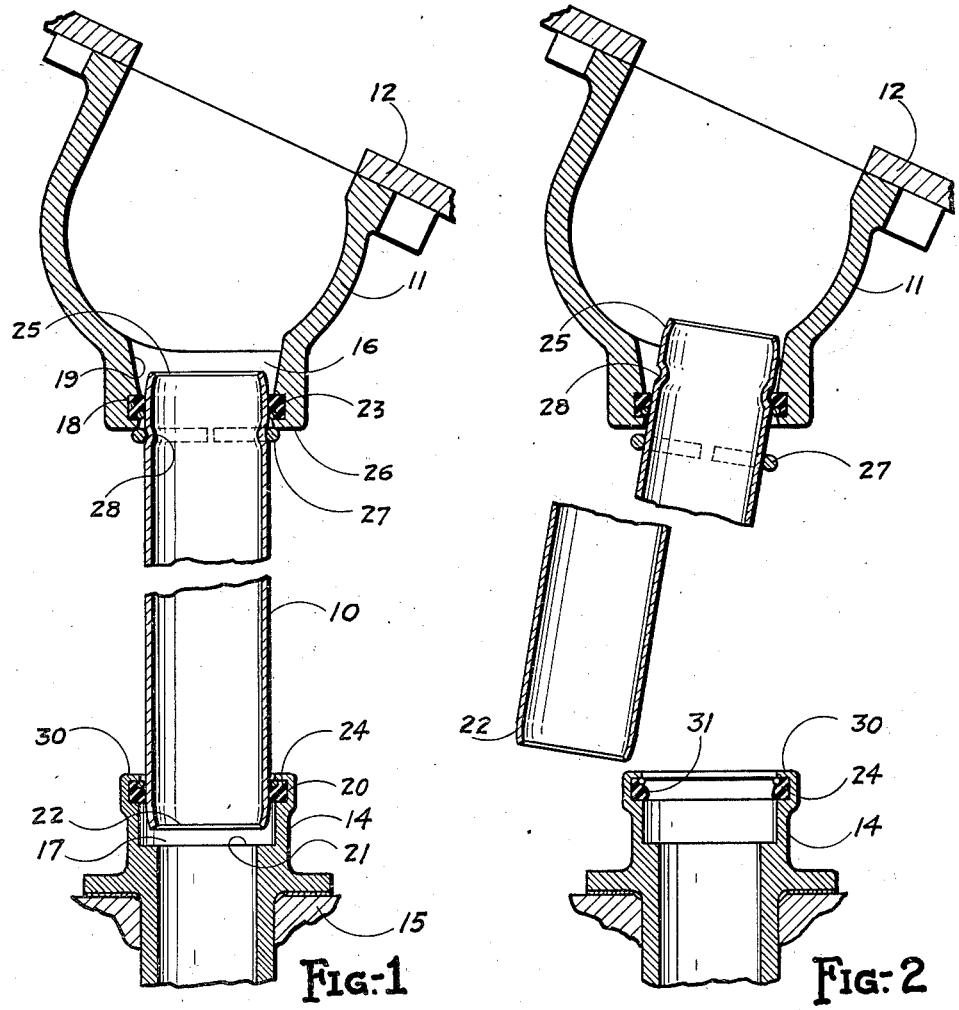
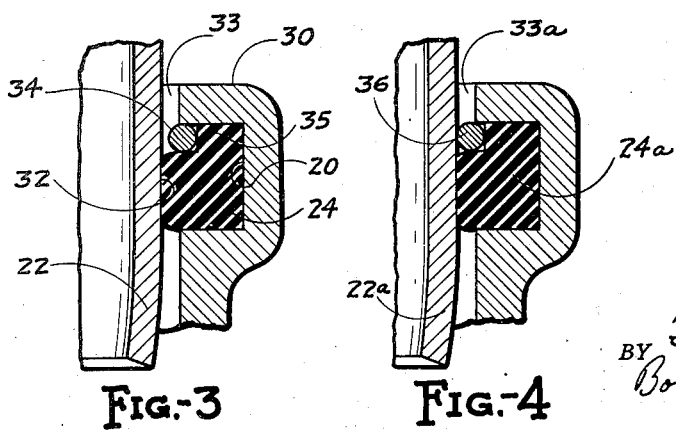
INVENTORS
HENRY D. STECHER
JEROME L. MURRAY
BY
ATTORNEYS Patented Dec. 16, 1947

2,432,592

UNITED STATES PATENT OFFICE 2,432,592

TUBULAR CONNECTION

Henry D. Stecher, Lakewood, Ohio, and Jerome L. Murray, Manhasset, N. Y., assignors to The Weatherhead Company, Cleveland, Ohio, a corporation of Ohio Application October 25, 1943, Serial No. 507,514

1 Claim. (Cl. 285—90)

This invention relates to tubular connections and is described herein as it may be applied to push rod tube assemblies such as used in radial aircraft engines. It is to be understood, however, that the device is useful in other installations, particularly where it is desired to make a connection between two substantially rigidly mounted parts, i. e., parts which cannot be removed relative to each other to facilitate making the connection between them, by means of a substantially rigid tube.

In radial aircraft engines, thin walled aluminum tubes are employed to enclose the valve operating push rods which extend from the crankcases of the engines to valve housings secured to the cylinder heads. The tubes extend from the housings to fittings rigidly mounted in the crankcase, enclosing the push rods which extend from the cam followers in the crank case to the valve operating mechanism within the housings. Oil is circulated through the tubes to lubricate the valve mechanism. While the fittings and housings are rigidly mounted on the engine, and have aligned openings, slight relative movement between these parts takes place in operation of the engine because of vibration and thermal expansion and contraction. However, in spite of these severe operating conditions, the push rod tubes must be effectively sealed to the valve housings and crankcase fittings to prevent loss of lubricating oil and to protect the valve operating mechanism from dirt and dust, and the arrangement should be such that the tubes can be readily installed or removed without disturbing or moving the housings or fittings. The prevention of leakage of oil in military aircraft installations is extremely important, for oil leaking from the engines is apt to foul the windshield and the gun blisters, and seriously impair the vision of the pilot and gunners. Heretofore push rod tube assemblies have required the use of flexible hose and hose clamps in addition to the metallic tubes in order to make the desired connections. These devices have been comparatively heavy, have been difficult to assemble, and embodied many points where leakage could and did take place.

A general object of the present invention is to provide a simple and light tubular connection adapted to meet the requirements for push rod tube assemblies noted above. Another object is to provide such a connection which can be manufactured at low cost. Another object is to provide such a connection which can be readily installed and removed. A further object is to provide a tubular connection having only two fluid joints and which will be leak-proof and remain leak-proof under severe conditions of operation. Another object is to provide a tubular connection embodying a substantially rigid tube, yet permitting slight relative movement of the parts without imposing any substantial strains thereon, and which will thus withstand the vibrations, movements and thermal expansions such as those encountered in the operation of airplane engines.

Further objects and advantages will become apparent from the following description of a preferred form of our invention, reference being made to the accompanying drawings wherein Figure 1 illustrates our connection as applied to the push rod tube assembly of a well-known aircraft engine of radial type; Figure 2 illustrates one stage in the assembly of the device; Figure 3 is a detail on an enlarged scale showing a seal of the type preferably employed at the ends of the tube; and Figure 4 is a similar detail illustrating a type of seal particularly adapted for high pressure service.

As shown in Figure 1, the push rod tube 10 extends from the valve housing member 11 mounted on the cylinder head of an engine which is indicated in fragmentary and diagrammatic fashion at 12, to the fitting 14 mounted in the engine crankcase, which is indicated in diagrammatic and fragmentary fashion at 15. The housing 11 and fitting 14 have aligned openings 16 and 17, respectively, the push rod making an operating connection between the valve mechanism within the housing and a cam follower which extends into the fitting 14. (These engine parts are not shown in the drawing as they form no part of the present invention.) The function of the push rod tube 10 is to form a sealed enclosure for the push rod to form a conduit for the circulation of oil to the valve mechanism, to prevent loss of oil from the valve mechanism or crankcase and to protect the push rod and associated mechanisms from dirt and dust. It will be appreciated that while the cylinder head 12 and crankcase 15, on which the housing 11 and fitting 14 are rigidly mounted, are rigid portions of the same engine, nevertheless in service there may be slight relative movement between the housing and the fitting by reason of thermal expansion and contraction of the engine and by reason of vibration of the engine. Thus the connections between the tube 10 and the housing and fitting must be such as to permit such relative movement without causing leakage or imposing any substantial strains on the tube or other parts.

In order to provide an arrangement whereby the tube 10 may be readily assembled into position joining the parts 11 and 14 with a leak-proof fluid-tight connection capable of permitting the relative movements noted above, we preferably form the interior of the housing 11 with a seal receiving channel 18 and an inwardly flared opening as indicated at 19. The fitting 14 is provided with a similar seal receiving channel 20 and an inwardly extending shoulder 21, the minimum diameter of the shoulder being less than the diameter of the end portion 22 of the tube 17 so that the shoulder forms a stop for the tube. As shown in the drawings, the end portion of the tube is preferably spun inwardly to a slight extent. Resilient fluid seals, indicated in general at 23 and 24 and described in detail below are disposed in the channels, the seals being of such nature that slight longitudinal and angular movements can be accommodated without injury to the seals or loss of sealing efficiency.

As shown in the drawings, the tube 10 is substantially longer than the distance between the seals 23 and 24. The shoulder 21 is positioned so that the tube cannot move longitudinally toward the fitting 14 a distance sufficient to destroy the sealing engagement between the end portion 25 of the tube and the seal 23. The end portion 25, like the opposite end portion 22, is preferably spun inwardly as shown. In order to prevent the disengagement of the tube from the fitting 14 by movement in the opposite direction, that is, by movement toward the housing member 11, we provide a stop on the exterior of the tube 10, preferably disposed adjacent the end face 26 of the housing 10 when the tube is in position in the assembly. The stop preferably comprises a transversely split, resilient snap ring 27 disposed in the groove 28 in the tube in order to lock the tube in position, and which may be removed from the groove and displaced downwardly along the tube as indicated in Figure 2 during the assembly of the tube. When the snap ring is in the groove, it is locked against accidental displacement and the tube cannot be moved in the direction of the housing sufficiently to disengage the end 22 of the tube from proper sealing contact with the seal 24. Yet the tube is only retained in position by the snap ring and the shoulder, no clamping members being employed, and thus relative movement between the housing and the fitting will not impose any substantial strain on the tube, the only load being due to the frictional engagement of the seals 23 and 24.

While the tube is securely retained in position against accidental displacement, nevertheless the construction is such that the assembly of the tube with the housing and fitting or the removal therefrom can be carried out very readily. As shown in Figure 2, the inwardly spun portion 19 of the bore of the housing permits the axis of the tube to be angularly displaced from the common axis of the two openings 16 and 17. Thus to insert the tube, it is only necessary to remove the snap ring 27 from the groove 28 and slide it downwardly from the end of the tube as shown in Figure 2, then insert the end 23 of the opening 16 in the housing with the axis of the tube disposed at such an angle that the end 22 of the tube clears the external surface of the fitting 14. Then the tube is pushed into the housing until the end 22 of the tube will clear the end face 30 of the fitting 14. The tube is then swung into alignment with the opening of the fitting and pushed into it to the position shown in Figure 1 and the tube is then locked in position by moving the snap ring 27 into locking position in the groove 28. The tube may be removed very readily by reversing the procedure outlined above, that is, by removing the snap ring from the groove 28 and sliding it downwardly along the tube. The tube is pushed up into the housing until the end 22 will clear the end face 30 of the fitting 14, then is swung laterally until it can be removed by pulling it out of the housing at an angle such as that shown in Figure 2. In practice in airplane engine work, the push rod and tube are assembled together before installation and put into position simultaneously. However, as noted above, the construction of the push rod and associated mechanism forms no part of the present invention and will not be described herein.

Leakage between the ends of the tube and the housing 10 and fitting 14 is prevented by means of the sealing rings 23 and 24 disposed within the channels 18 and 20, respectively. While any suitable sealing means may be employed, seals of the type illustrated in detail in Figure 3 are particularly adapted for this purpose as they permit easy assembly of the parts, will withstand severe service requirements for long periods of time, and are such that an effective fluid seal is maintained regardless of slight amounts of relative movement between the parts. Figure 3 illustrates the seal 24 in the fitting 14, but the seal in the housing is similar in all material respects.

Preferably the seal comprises the main sealing ring 24 composed of resilient rubber or rubber-like material, either natural or synthetic and preferably of an oil-resisting composition (it being my intention to include all such materials in the term "rubber" as used hereinafter in the specification and claim), and having a body portion adapted substantially to fill the groove 20 as shown and an initially rounded sealing portion 31 (see Figure 2) of less width than the groove and compressed into sealing engagement with the outer surface of the tube as indicated at 32. It will be noted that there is considerable clearance between the inner walls of the opening 17 and the tube as indicated at 33. This clearance increases the ease of assembly of the device and makes it unnecessary to hold the parts to very close tolerances, as would be required if a close fit were necessary.

In order to prevent possible displacement of the sealing ring from the groove, even though a relatively large clearance is employed, we preferably provide a retaining ring 34. Preferably this is a transversely split steel ring which is compressed to insert it into the channel, and which expands into engagement with the flange 35 of the sealing ring. The retaining ring thus locks the sealing ring in position, and while it preferably does not engage the tube, it partially blocks the clearance 33. Thus the tube is supported by the resilient rings and there is no metal to metal contact between the tube and either the housing or fitting. The cushioned support provided by our construction thus eliminates the chafing and wear of the parts which is encountered with metal to metal connections because of the vibration of the parts in service.

The inwardly spun ends of the tube increase the ease with which the tube may be inserted within the steel ring and the rubber ring, and eliminate the possibility of damage to the rubber ring in the assembly operation. The inward spinning of the ends adds to the freedom of movement of the tube afforded by the clearance space.

Thus angular displacement of the tube sufficient for the assembly and disassembly operations and much greater than any such displacement that may be normally encountered after the assembly is made, can take place without engagement between the external surfaces of the ends of the tube with the interior surfaces of the bores.

Where high fluid pressures may be encountered in service, we prefer to use seals constructed generally in accordance with the teachings of the application of Elmer F. Jackman, Serial No. 427,965, filed January 23, 1942. Such a seal is illustrated in Figure 4 of the drawings and differs from the seal of Figure 3 particularly in that the split ring 36 engages the tube 22a and prevents extrusion of the material of the sealing ring 24a into the clearance 33a, the ring 24a being similar to the ring 24 previously described, while the ring 36 is preferably composed of a material harder than the sealing ring, such as steel, Bakelite, or other suitable metal, plastic or the like. The ring 36 is of sufficient radial thickness effectively to block the clearance space and is urged into engagement with the tube by the sealing ring under the influence of fluid pressure, thus preventing extrusion of the sealing ring as described in greater detail in the aforesaid Jackman application.

From the foregoing description of a preferred form of my invention it will be seen that we have provided a simple and effective tubular connection which is particularly adapted for push rod tube assembles in aircraft engines. Our connection is extremely light in weight, and is economical to manufacture for it merely comprises the tube and the snap ring and the sealing members which are disposed in grooves in the housing and fitting, respectively. No threaded connections or clamps are required, thus reducing the cost of manufacture and the time required for assembly. Assembly of the device requires no particular skill on the part of the workman. Because clearance may be provided between the tube and the housing and the fitting with the preferred form of seals, the rubber seal members not only seal against leakage of fluid but also act to absorb and compensate for vibrations and slight relative movement of the parts, thus providing cushioned supports for the tube. The sealing devices are leak-proof and will remain so in service, permit reasonably wide manufacturing tolerances in the construction of the device, and increase the ease of assembly.

While we have described the invention as applied to a push rod tube assembly, those skilled in the art will appreciate that the invention may be useful in other environments. Various changes and modifications may be made in our device without departing from the spirit and scope of our invention. Accordingly, it is to be understood that our patent is not limited to the precise embodiment shown herein or in any manner other than by the scope of the appended claim.

We claim:

A push rod tube assembly comprising a housing member and a fitting member, said members being adapted to be mounted on spaced parts of an internal combustion engine and having aligned bores when so mounted, a substantially rigid tube connecting said members and extending into said bores, the bore of said housing being enlarged inwardly of the mouth thereof to permit angular movement of the tube with respect thereto, stop means for limiting the movement of said tube with respect to said members, said stop means including a snap ring on the exterior of said tube adapted to be disposed in a groove in the tube closely adjacent the opening of said housing when the parts are assembled and removable from the groove to permit assembly and disassembly of the parts, and resilient sealing means, independent of said stop means, disposed within said bores for creating fluid seals between said members and said tube and for resiliently supporting said tube, said stop means preventing accidental disengagement of the tube from said sealing means.

HENRY D. STECHER.
JEROME L. MURRAY.

REFERENCES CITED

The following references are of record in the file of this patent:

UNITED STATES PATENTS

| Number | Name | Date |
| --- | --- | --- |
| 2,344,698 | Howe | Mar. 21, 1944 |
| 1,057,763 | Mueller et al. | Apr. 1, 1913 |
| 2,174,105 | Haury | Sept. 26, 1939 |
| 1,861,372 | Waters | May 31, 1932 |